J. L. Winslow
Stop Cock.

№ 21,237.  Patented Aug. 17, 1858.

UNITED STATES PATENT OFFICE.

J. L. WINSLOW, OF WESTBROOK, MAINE, ASSIGNOR TO JAMES N. WINSLOW, OF PORTLAND, MAINE.

STEAM-COCK.

Specification of Letters Patent No. 21,237, dated August 17, 1858.

*To all whom it may concern:*

Be it known that I, JOSEPH L. WINSLOW, of Westbrook, in the county of Cumberland and State of Maine, have invented an Improved Steam Cock or Hydraulic Valve; and I do hereby declare that the same is fully described and represented in the following specification and the accompanying drawings, of which—

Figure 1:
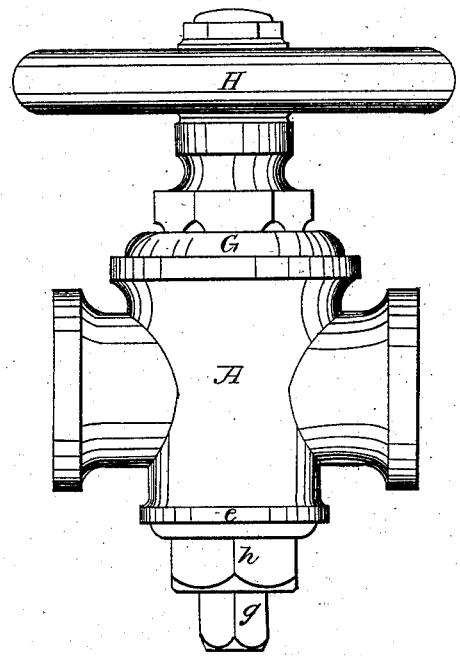
Figure 2:
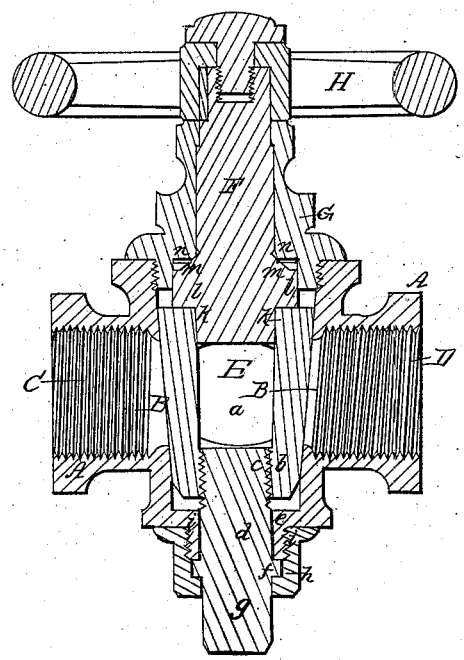
Figure 3:
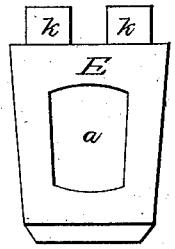
Figure 4:
Figure 5:
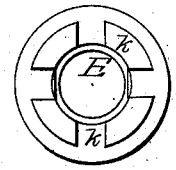
Figure 6:
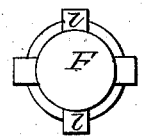
Figure 7:
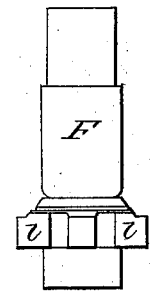

Figure 1, is a side view, and Fig. 2, a vertical and longitudinal section of it; Fig. 3, is a side view of its tapering or conical plug, while Fig. 4, is a side view of its supporting and adjusting screw. Fig. 5, is a top view of the said plug; Fig. 6, a lower end view of the shank or spindle of, the plug, and Fig. 7, a side view of such spindle.

In these drawings, A denotes the case of the steam cock, which is formed with a conical or tapering valve chamber B, B furnished with an induction passage C, and an eduction passage, D, the said passages being arranged with their axes in line with one another and at right angles to the axis of the plug chamber, B. Within, the said chamber, B, there is arranged a tapering or conical plug, E, made to fit the chamber and to have a passage $a$, extended through it at right angles to its axis, as shown in the drawings. The foot of the plug has a female screw, $b$, formed in it to receive a male screw, $c$, whose shank, $d$, extends through the bottom, $e$, of the valve case, A, and is formed cylindrical so as to be capable of being turned axially, freely within the case. This shank is furnished with an annular projection, $f$, and a polygonal head $g$, over which a cup $h$, is passed and screwed to the valve case as shown at $i, i$, in Fig. 2. For convenience of operating the plug, E, or raising it quickly off its seat the screws, $b$, and, $c$, may be what are termed either double or triple headed screws. Furthermore the upper part of the plug E, is formed with a half clutch $k, k$, to engage with another half clutch, $l, l$, projecting from a spindle, F, made entirely separate from the plug E, and applied to the screw cap, G, of the case, A, so as to be capable of freely rotating therein. Near its lower part, the spindle is furnished with a conical shoulder, $m$, to rest and bear against a corresponding seat, $n, n$, formed in the cap, G. A wheel H, or its equivalent is secured to the upper end of the spindle, F.

In constructing the plug E, it should be made in such manner that when the line of the axis of its passage, $a$, is turned around at right angles with the common axis of the passages, C, D, all communication between the said passages, C, D, shall be cut off by the plug, the communication being opened between them when the axis of the passage, $a$, is in the same straight line with the axes of the passages, C, D.

From the above it will be perceived, that when the spindle, F, is turned around by the hand of a person applied to the wheel, H, the valve plug, E, also will be put in revolution, and will turn on the screw, $c$. At the same time, the screws, $b$, and $c$, will cause the valve to rise from its seat or upward from the tapering inner surface of the valve chamber. The operating screws, $b, c$, therefore perform the function of freeing the valve from its seat, so as to enable it to be rotated with ease. Furthermore, the mode of applying the screw, $c$, to the case, $a$, enables the plug to be drawn closely upon its seat, however the plug may become worn. For by turning the male screw around axially, the plug may be either moved downward or raised upward as circumstances may require. While the plug is in operation or being rotated, the screw, $c$, remains stationary as it can have no endwise motion in consequence of the manner in which it is applied to the case, A.

By constructing the spindle, F, with a tapering annular shoulder, $m$, to rest against the seat, $n$, the pressure of the steam within the cock or faucet will operate to force the shoulder up to its seat and prevent the escape of steam between them. This renders unnecessary a stuffing box or any packing about the spindle, the joint between the parts, $m$, and, $n$, becoming more perfect, the more the former is turned against the latter.

One advantage of my invention is to be found in its dispensing with all necessity of packing around the spindle, F, which when used is liable to leakage and other well known difficulties. Another advantage arises from the arrangement of the plug supporting screw, $c$, and its mode of application to the case A, as by means thereof we are enabled to adjust the plug to its seat, however either or both may become worn.

I do not claim the application of a screw directly to the shank or spindle of a valve in order to support the spindle during its rotary movements and to move the valve either toward or away from its seat, but
What I do claim is—

1. Arranging the operating screws, $b$, $c$, at the foot of the plug and its case so as to be capable of being rotated therein without at the same time having any longitudinal motion.

2. And I also claim making the spindle, F, separate from the plug E, and combining with them and the case the bearing shoulder $m$, and the clutch connection, the whole being substantially as described.

In testimony whereof, I have hereunto set my signature.

JOSEPH L. WINSLOW.

Witnesses:
G. V. FARNHAM,
A. B. WINSLOW.